March 5, 1935.  E. A. REUSSENZEHN  1,993,624
SCALE SUPPORT
Filed Sept. 6, 1933
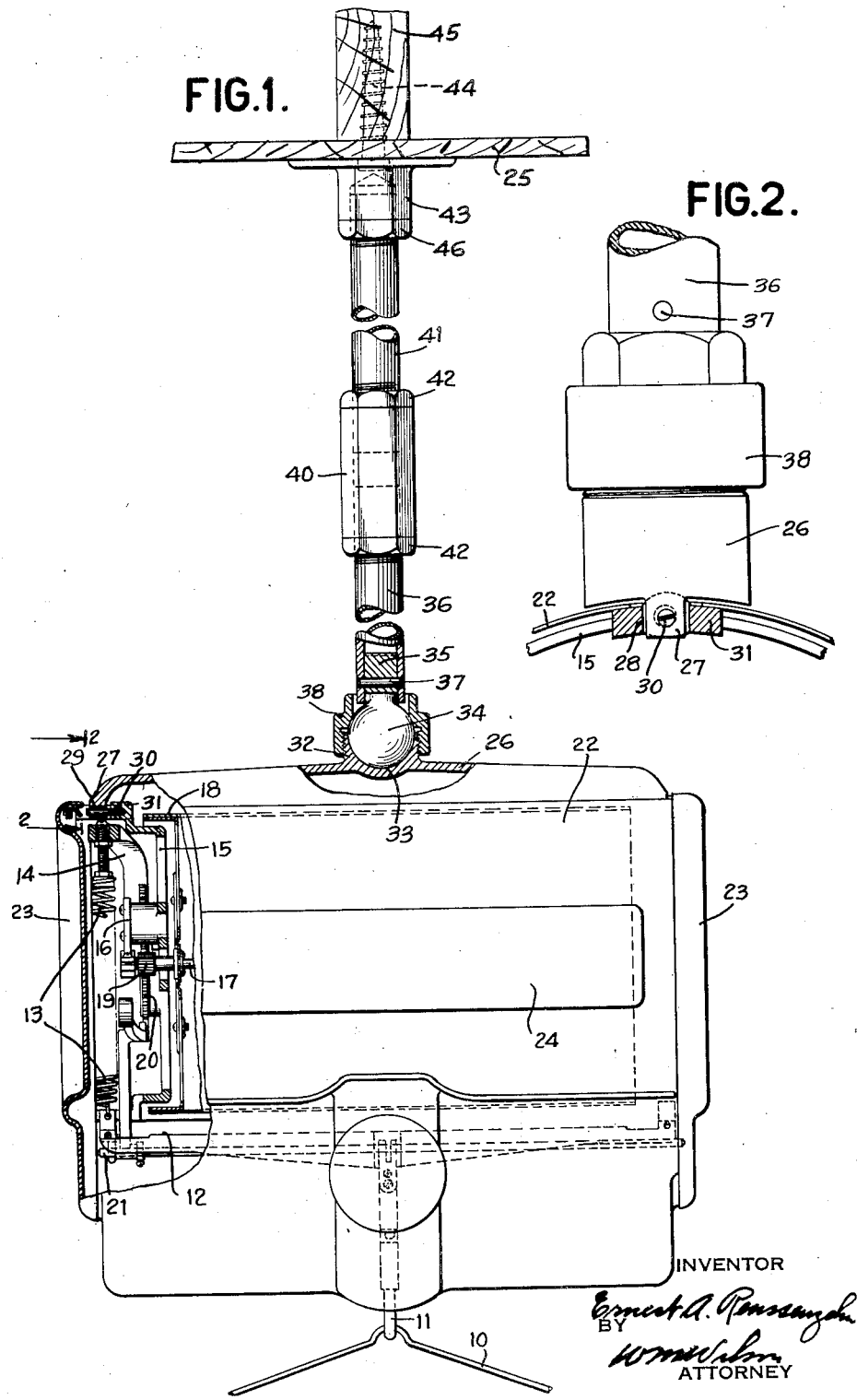
INVENTOR
Ernest A. Reussenzehn
BY
ATTORNEY Patented Mar. 5, 1935

1,993,624

UNITED STATES PATENT OFFICE 1,993,624

SCALE SUPPORT

Ernest Albert Reussenzehn, Dayton, Ohio, assignor, by mesne assignments, to The Hobart Manufacturing Company, Troy, Ohio, a corporation of Ohio Application September 6, 1933, Serial No. 688,276

6 Claims. (Cl. 248—30)

This case relates to weighing scales of the hanging type. Such scales are usually freely suspended by hooks or bails from an overhead support. While this may be satisfactory for light dial scales, to suspend heavy drum scales in this fashion is undesirable because impact against such a scale causes it to jerk and swing violently in all directions. Further, it has been found that drum scales as well as other scales should be leveled to provide accurate weighings. When the scale is freely suspended, it is impossible to assure a level condition of the scale during weighing operations. Accordingly, the object is to provide improved generally rigid means for suspending a scale from an overhead support.

Further, such object contemplates provision of a generally rigid suspension for the scale with means for facing the scale in any desired direction.

Still further, the object contemplates provision of a substantially rigid suspension for a scale with means for leveling the scale, that is adjusting it to a position such as it would have if rested on a perfectly horizontal table.

Various other objects and advantages of my invention will be obvious from the following particular description of one form of mechanism embodying the invention or from an inspection of the accompanying drawing; and the invention also constitutes certain new and novel features of the construction and combination of parts hereinafter set forth and claimed.

In the drawing:

Fig. 1 is a front view, partly sectioned, of the invention and,

Fig. 2 is a section on line 2—2 of Fig. 1.

In detail, the scale is of the computing drum type and comprises bail 10 for supporting a load pan (not shown). The bail hangs from a draft rod 11 which is connected to a horizontal draw bar 12, each end of which is connected to the lower end of a weighing spring 13. The upper end of each spring is suspended from portion 14 of the end casting 15.

Each end casting has attached thereto bearing brackets 16 carrying the bearings for the ends of shaft 17 of the computing cylinder chart 18. To rotate the shaft, pinions 19 thereon are meshed with rack members 20 which are connected at their lower ends to the equalizer rod 21 secured to the draw bar for movement therewith. The scale is enclosed by a housing 22 including removable end caps 23 and a sight window 24 through which the chart readings are viewed. When a load is placed on the scale, the draw bar is depressed to stretch springs 13 and lower racks 20 which through pinions 19 rotate shaft 17 and the computing chart 18 carried thereby. For further particulars of above construction, reference may be had to Patent 1,690,258.

To suspend the above parts from an overhead support 25 such as a ceiling, the following means are provided. Across the top of the housing 22 is placed a hollow, top channel 26 which at each end is provided with a depending lug 27 entering the housing 22 and fitting into a slot 28 formed at the top on the end frame. Each lug 27 is formed with a horizontally extending smooth hole 29 through which freely passes a stud 30 screwed into a lug 31 cast with each end frame 15. There is sufficient clearance between the top of housing 22 and the top channel 26 and between the sides of lugs 27 and slots 28 to permit only a slight pivotal movement of the scale relative to the channel on pins 30 as pivots. This movement is merely sufficient after the scale has been substantially leveled (as will be later described) to cause the scale to hang with its vertical axis perfectly plumb. The clearance however is so slight as to prevent noticeable oscillation of the scale on the pivots 30 when the scale is used in weighing an article. In use, therefore, the scale is to all practical purposes apparently rigidly dependent from top channel 26.

Midway of its ends, the channel 26 is formed with an externally threaded nipple 32 the interior of which is spherically concave to form a seat 33 for the lower half of a ball 34, formed on the end of a number 35 rigidly secured within the lower end of a pipe section 36 by means of a pin 37. The upper half of the ball 34 is seated within a spherical concavity formed in a nut 38 which threads onto nipple 32. The ball 33 provides a universally adjustable connection between the pipe section 35 and channel 26. Since the scale is to be rigidly suspended from the ceiling 25, to insure weighing accuracy, it is necessary to level the scale just as though it rested on a perfectly horizontal support. To level the scale, the nut 38 is loosened from ball 34 permitting the seat 33 to turn in any direction on the surface of the ball until the scale has been correctly leveled. This leveling adjustment is coarser than the self-leveling adjustment of the scale described above, but is also restricted by limiting the clearance between the nut 38 and the pipe section 35. After the relatively coarse level adjustment has been made, the nut 38 is moved down on the nipple 32 to thereby clamp the ball 34 tightly against its seat 33 so as to prevent relative movement between the scale channel and the support therefor. The ball and socket connection also permits the scale to swivel about the ball in a horizontal direction to face the front of the scale and its sight window 24 in any desired direction. To detach the scale from its support, all that is necessary is to unscrew nut 38 from the nipple 31.

The leveling adjustment is made as finely as possible but to further provide the last degree of leveling accuracy, the scale is freely suspended for a slight movement from lugs 27 of the channel bar 26, as previously explained.

Pipe section 36 is threadedly connected to a coupling 40 which in turn is threaded on an upper pipe section 41. The coupling 40 may be turned to adjust the spacing of the pipe sections 36 and 41 from each other, thereby varying the height of the scale. After the adjustment for height is made, the lock nuts 42 are tightened to maintain the parts in set position.

At its upper end, pipe 41 is threaded into a bracket 43 with which is cast a wood screw 44 for fastening the bracket to the ceiling 25 and beam 45. Lock nut 46 holds the parts 41 and 43 against relative rotation.

While there has been shown and described and pointed out the fundamental novel features of the invention as applied to a single modification, it will be understood that various omissions and substitutions and changes in the form and details of the device illustrated in its operation may be made by those skilled in the art without departing from the spirit of the invention. It is the intention therefore to be limited only as indicated by the scope of the following claims.

What is claimed is as follows:

1. Means for suspending from a support an indicating mechanism in which a drum housing and end frames adjacent opposite ends of said housing are provided; comprising in combination, a bar horizontally extending across the top of the housing and provided with end lugs adjacent the upper ends of said frames, securing elements between the end lugs and the upper ends of said frames to dependently carry the said mechanism from the top bar, vertical means rigidly depending from said support, and connections between the lower end of said means and a central part of the top bar for hanging the bar and the said mechanism carried thereby from said support, said connections including adjustable means for leveling the said mechanism and fixable in place after adjustment to maintain the said mechanism substantially rigidly in leveled position.

2. Means for suspending from an overhead support a computing drum scale in which a drum housing and end frames adjacent opposite ends of said housing are provided; comprising in combination, a bar horizontally extending across the top of the housing and provided with end lugs adjacent the upper ends of said frames, elements securing the lugs to said upper ends of the frames to thereby dependently carry the scale from the top bar, vertical means rigidly depending from said overhead support, and connections between the lower end of the vertical means and the top bar for hanging the bar and the scale carried thereby from the overhead support, said connections including universally adjustable means for angularly moving the bar and scale relative to the vertical means in any direction to level the scale and fixable in place after adjustment to maintain the scale substantially rigidly in leveled position.

3. Means for suspending from an overhead support a computing drum scale in which a drum housing with a sight window and end frames adjacent opposite ends of the housing are provided; comprising in combination, a bar extending horizontally across the top of the housing, elements for securing the bar to the frame to dependently carry the scale from said bar, vertical means rigidly depending from said overhead support, and connections between the bar and the lower end of said vertical means for suspending the bar and scale from the overhead support, said connections including a swivel about which the bar and scale is turnable to face the sight window in any desired direction, and means for fixing the bar to the swivel against turning movement after adjustment.

4. Means for suspending from an overhead support a mechanism in which a horizontally disposed housing and end frames adjacent opposite ends of the housing are provided; comprising in combination, a suspension therefor comprising a bar horizontally extending across the top of the housing and provided at its ends with depending lugs entering the housing adjacent the upper ends of said frames, pins pivotally connecting the end frames to said lugs to freely suspend the said mechanism from the top bar for providing a self-leveling adjustment of the said mechanism, means for closely restricting the free swinging movement of the said mechanism relative to the bar, and a rigid vertical connection depending from said overhead support to the central portion of the top bar to substantially rigidly hang the bar and said mechanism from the overhead support.

5. Means for suspending from an overhead support a computing drum scale in which a drum housing and end frames, one adjacent each end of the housing, are provided; comprising in combination, a top bar extending horizontally across the housing and having dependent lugs at each end entering the housing and fitting into slots formed in the end frames, pivot pins connecting the lugs to the end frames to freely hang the scale from the top bar to provide a self-leveling movement of the scale relative to the bar, said self-leveling movement being closely restricted by engagement of the lugs with the walls of said slots, and a rigid depending connection from said overhead support to said bar to hang the scale from the overhead support.

6. Means for suspending from an overhead support a computing drum scale in which a drum housing and end frames adjacent opposite ends of the housing are provided; comprising in combination, a top bar extending horizontally across the top of the housing and having end lugs entering the housing and fitting between slots in the end frames, pivot pins connecting the end lugs to the end frames for freely hanging the scale from the top bar to provide a relatively free self-leveling movement of the scale, said movement being closely restricted by the walls of said slot engaging the sides of said lugs, rigid vertical means depending from said overhead support, and connections between the lower ends of said means and the middle of the top bar to suspend the scale from the overhead support, said connections including provisions for providing a relatively coarse leveling adjustment of the bar and scale.

ERNEST ALBERT REUSSENZEHN.